(12) United States Patent
Mothersbaugh et al.

(10) Patent No.: US 8,997,863 B2
(45) Date of Patent: *Apr. 7, 2015

(54) METHOD FOR USING ELECTROCOAGULATION IN HYDRAULIC FRACTURING

(71) Applicant: Water Tectonics, Inc., Everett, WA (US)

(72) Inventors: James Mothersbaugh, Everett, WA (US); Marvin Eugene Hancock, Everett, WA (US)

(73) Assignee: Water Tectonics, Inc., Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,258

(22) Filed: Dec. 5, 2012

(65) Prior Publication Data

US 2013/0228331 A1 Sep. 5, 2013

Related U.S. Application Data

(63) Continuation of application No. 12/692,963, filed on Jan. 25, 2010, now Pat. No. 8,347,960.

(51) Int. Cl.
*E21B 43/26* (2006.01)
*C02F 1/52* (2006.01)
*C02F 1/461* (2006.01)
*C02F 1/00* (2006.01)
*C02F 1/463* (2006.01)
*E21B 43/40* (2006.01)
*C02F 9/00* (2006.01)
*C02F 103/10* (2006.01)

(52) U.S. Cl.
CPC ............ *E21B 43/26* (2013.01); *C02F 1/008* (2013.01); *C02F 1/463* (2013.01); *E21B 43/40* (2013.01); *C02F 1/001* (2013.01); *C02F 1/52* (2013.01); *C02F 9/00* (2013.01); *C02F 2103/10* (2013.01); *C02F 2209/001* (2013.01); *C02F 2209/003* (2013.01); *C02F 2209/006* (2013.01); *C02F 2209/06* (2013.01); *C02F 2209/11* (2013.01); *C02F 2209/40* (2013.01)

(58) Field of Classification Search
USPC ........... 166/250.01, 250.1, 267, 308.1–308.3, 166/90.1; 210/702, 748.01; 205/742; 204/660–674, 554–573
See application file for complete search history.

(56) References Cited

U.S. PATENT DOCUMENTS

| | | | |
|---|---|---|---|
| 7,758,742 B2 * | 7/2010 | Powell | 205/742 |
| 8,347,960 B2 * | 1/2013 | Mothersbaugh et al. | 166/267 |
| 2005/0274606 A1 * | 12/2005 | Powell | 204/228.2 |
| 2009/0107915 A1 * | 4/2009 | Skinner et al. | 210/636 |
| 2010/0038310 A1 * | 2/2010 | Shafer et al. | 210/605 |

* cited by examiner

*Primary Examiner* — Catherine Loikith
(74) *Attorney, Agent, or Firm* — Bruce A. Kaser

(57) ABSTRACT

A method of improving natural gas release from a well via an enhanced hydraulic fracturing operation. The method includes capturing or retrieving the flow back from the well following the fracturing operation. The flow back or other source water is introduced to an electrocoagulation ("EC") treatment process. EC treatment separates the water from other fracturing fluid components in the flow back and also removes bacteria and other contaminants. Thereafter, the EC-treated fluid is recycled for subsequent fracturing operations. The process may also be used to treat all source water, including fresh water delivered to the well before it is used as a fracturing fluid.

5 Claims, 7 Drawing Sheets

METHOD FOR USING ELECTROCOAGULATION IN HYDRAULIC FRACTURING

TECHNICAL FIELD

The invention disclosed here generally relates to hydraulic fracturing methods for enhancing the production of a natural gas well. More specifically, the invention is directed to a method of enhancing the fracturing and natural gas release process by pre-treating water used in the fracturing fluid and/or recycling treated flow back fluid or source water previously used in the hydraulic fracturing process.

BACKGROUND OF THE INVENTION

"Hydraulic fracturing" is a common and well-known enhancement method for stimulating the production of natural gas. The process involves injecting fluid down a well bore at high pressure. The fracturing fluid is typically a mixture of water and proppant (the term "proppant" includes sand and synthetics). Other chemicals are often added to the proppant to aid in proppant transport, friction reduction, wettability, pH control and bacterial control.

Varying amounts of water are required in a typical hydraulic fracturing operation. Water is usually trucked to the well head site from other locations, typically in large quantities. The water may come from a variety of sources that include untreated water from rivers, lakes, or water wells. Once delivered to the well head site, the water is mixed with the proppant particulates and then pumped down the well bore.

During the fracturing process, the fracturing fluid penetrates producing formations (sometimes called "subterranean formations") at sufficient hydraulic pressure to create (or enhance) underground cracks or fractures—with the proppant particulates supporting the fracture for "flow back." Sometimes the process is repeated a multiple number of times at the well site. When this is done, the well head is closed between stages to maintain water pressure of the fracturing fluid for a period of time.

The process creates a significant amount of fluid "flow back" from the producing formation. Untreated flow back often is not recyclable in subsequent fracturing operations because of the contaminants it contains. Flow back is normally hauled away and treated off-site relative to the geographic location of the well head.

Hydraulic fracturing is very important to companies involved in the production of natural gas. These companies have made large investments in looking for ways to improve upon all phases of the fracturing operation. One obvious drawback to fracturing involves the high cost of hauling water to the well head site followed by retrieving and hauling away the flow back by-product for off-site treatment and subsequent disposal.

There have been many attempts at improving gas production that results from fracturing operations by varying the make-up and use of the fracturing fluid. Attempts at stimulating natural gas production via fracturing generally falls in two categories: hydraulic fracturing and "matrix" treatments.

Fracturing treatments stimulate gas production by creating more flow paths or pathways for natural gas to travel up the well bore for retrieval. Matrix treatments are different in that they are intended to restore natural permeability of the underground formation following damage. The make-up of the fracturing fluid is often designed to address different situations of this kind by making adjustments in the material and chemical content of the fluid and proppant particulates.

The methods and processes disclosed here involve the quality of the water used to make up the fracturing fluid and treatment of flow back and other water-based fluids produced from hydraulic fracturing or other source waters for gas retrieval operations. There are many advantages to the methods disclosed here: First, the disclosed methods provide a means for significantly reducing trucking costs to and from the well head site that directly relate to the large quantities of water typically needed for hydraulic fracturing. Second, the disclosed methods offer a viable way to recycle the water used as the fracturing fluid in an energy efficient treatment process at the well head site. Third, because of the nature of the treatment process, for reasons explained below, the delivered or recycled water component in the fracturing fluid improves flow back and increases the quantity of natural gas produced that results from the fracturing operation.

In sum, the methods and processes disclosed below serve to improve natural gas production at a lower water treatment cost.

SUMMARY OF THE INVENTION

The invention disclosed here involves methods and processes for improving natural gas release from a well following a hydraulic fracturing operation. The method involves first introducing a hydraulic fracturing fluid into a producing subterranean formation via conventional means. The typical hydraulic fracturing fluid includes a mixture of water and other proppant particulates (or fracturing components). After the pressure on the fluid is released, at least a portion of the hydraulic fracturing fluid is captured from the subterranean formation (preferably, as much as possible). As indicated above, this is typically referred to as "flow back."

The captured fluid or flow back is separated from residual proppant particulates and then introduced to an electrocoagulation ("EC") treatment process. The EC treatment separates the water in the flow back from much of the inherent subterranean contaminants as well as other fracturing fluid components. Thereafter, the treated water is clean of contaminants and may be recycled into the fracturing fluid that is used in subsequent fracturing operations.

The EC treatment serves to reduce the viscosity of the fracturing fluid, which makes it function better in the underground or producing formation. Part of the viscosity improvement obtained via the EC treatment process relates to bacterial content removal and reduction in turbidity, in addition to removal of other particulates.

It is conceivable that the same type of EC treatment can be used to treat fresh water delivered to the well head from off-site locations. Even though it is relatively clean, newly delivered fresh water may still contain bacterial or other contaminants that impede the fracturing process. Therefore, EC treatment of water newly delivered to the well head site may be beneficial before it is mixed with proppant particulates and used to initiate a fracturing operation.

The EC system uses the combination of a variable power supply, step-down transformer(s), and an AC to DC rectifier to produce the required treatment conditions (proper electric current level). The design reduces the overall power consumed by EC cells in order to achieve clarity in the treated water over a wide range of water conductivity.

The variable power supply outputs an alternating current ("AC") typically in the range of 0 to 480 volts AC ("VAC"). The precise level is determined or controlled by a programmable logic controller ("PLC") that sets the VAC output. The VAC output from the power supply is then delivered to the variable step-down transformer, which has a series of "taps"

that further adjust the AC output prior to delivery to the rectifier. The taps are adjusted upwardly or downwardly depending on whether or not the desired operating current (or targeted current) is received by the EC cells within the system. The adjustment is made by monitoring the ratio of AC current to DC current.

Based on results to date, the methods and processes disclosed here will significantly reduce conventional transportation and disposal costs attributable to water hauling and treatment in hydraulic fracturing operations. Moreover, the desired water quality is achieved at lowered electrical cost relative to known EC systems. Finally, use of the methods and processes disclosed here appear to generate better flow back return from the well, and increased natural gas production, because EC treatment at the well head site decreases the volume of particles in the fluid that would otherwise be trapped in the fracture. EC treatment at the well head site also helps to reduce the ability of the water to form scales and precipitants while reacting with formation and other metals and minerals in the fracturing water. Not only does it immediately enhance production but it also improves the production life of the well. EC treatment provides other potential benefits such as overall reduction in proppant/chemical use and minimizing environmental impact because of better point-source control of contaminated water.

BRIEF DESCRIPTION OF THE DRAWINGS

In the drawings, like reference numerals refer to like parts throughout the various views, unless indicated otherwise, and wherein.

DETAILED DESCRIPTION

Figure 1:
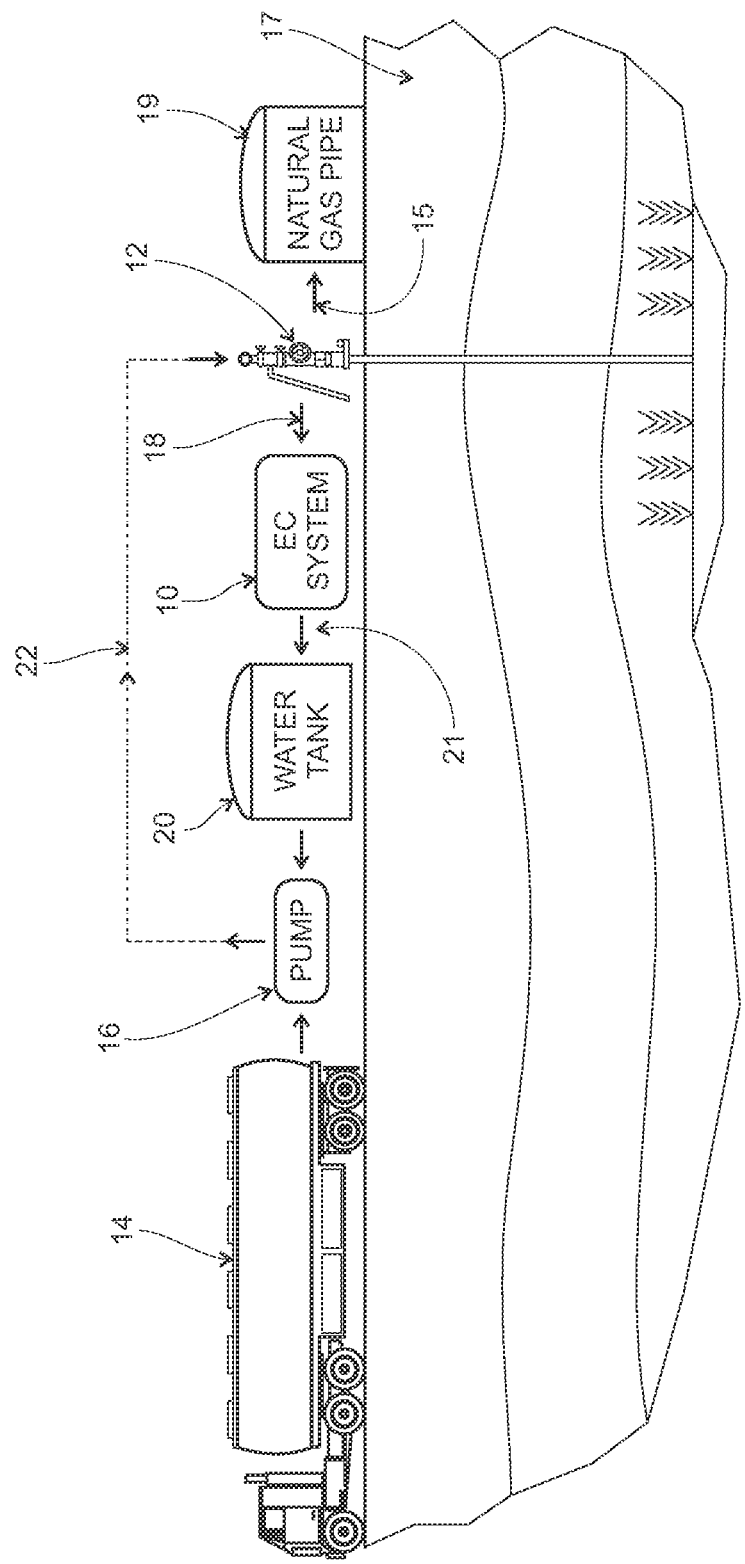
FIG. 1 is a schematic view of a well head site and illustrates the general treatment and recycling of fluid ("flow back") from the well head.

Referring first to FIG. 1, the general process will now be described. The process centers around the use of a portable electrocoagulation ("EC") system 10 (further described below) that is brought to a natural gas well head site 12. The EC system 10 is small enough to rest on a truck trailer bed (not shown in the drawings).

Figure 8:
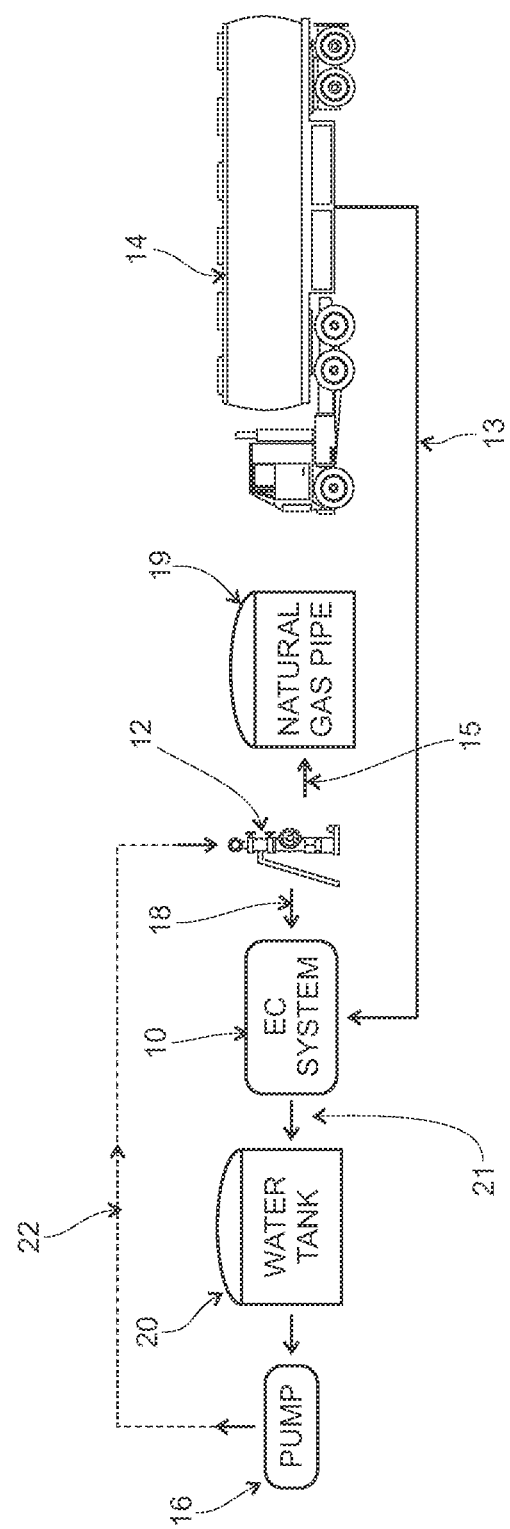
FIG. 8 is similar to FIG. 1, but illustrates treatment of water delivered to the well head site before its initial use in a fracturing operation.

Referring to FIG. 8, as an example, water that is to be used in the hydraulic fracturing operation is delivered to the well head site, as schematically indicated at 14 (by truck or other means). Newly delivered water (reference 13) is processed by the EC system 10 and then mixed with proppant particulates. It is then pumped (as illustrated at 16) down the bore at the well head location, thus introducing a hydraulic fracturing fluid into a subterranean formation (indicated at 17). This basic fracturing process is well-known in the gas industry, with the exception of using EC technology. Likewise, many different variations on the make-up and delivery of fracturing fluids and proppants have been used in the industry such as, for example, the materials described in U.S. Pat. No. 7,621,330 issued to Halliburton Energy Services, Inc. ("Halliburton").

As a person familiar with hydraulic fracturing operations would know, when the fracturing process is deemed to be completed, pressure is released at the well head 12, thus resulting in flow back of the fracturing fluid back up through the well head 12. Referring again to FIG. 1, the hydraulic fracturing fluid that makes up the flow back is captured, (indicated at 18) and passed directly to the EC system 10. Natural gas is retrieved (indicated at 15) and piped to a storage facility (indicated at 19).

The EC system 10, which will be further described in greater detail below, uses an EC treatment process to separate the water from other components in the flow back. The EC-treated water is then held in a storage tank 20. Thereafter, it is mixed with new proppant particulates and recycled (indicated at 22) for subsequent hydraulic fracturing operations.

For reasons described later, the EC system 10 will significantly reduce flow back parameters like turbidity and bacteria to very low levels. With the exception of sodium and chloride contaminants, other chemicals in the flow back are likewise reduced via the EC treatment process.

Moreover, recycling the EC-treated water by subsequent mixing with conventional proppant particulates is beneficial to the hydraulic fracturing or fracking process. Processing the flow back (or delivered fresh water) via the EC process 10 and recycling it in subsequent operations positively affects viscosity of the fracking fluid (by reducing viscosity) and, consequently, affects the release of natural gas from the subterranean formation.

The EC process reduces viscosity ($\mu$) in Darcy's general equation:

$$Q = \frac{-\kappa A}{\mu} \frac{(P_b - P_a)}{L}$$

The reduction in $\mu$ is particularly acute with respect to diminishing imbibition in rocks less than 1 milli-Darcy. By reducing $\mu$ and, consequently, imbibition, the fractured interface is significantly less damaged, which benefits the recovery of the fracturing fluid (i.e., the flow back) and improves gas recovery from the well head.

The total discharge, Q (units of volume per time, e.g., m³/s) is equal to the product of the permeability ($\kappa$ units of area, e.g. m²) of the medium, the cross-sectional area (A) to flow, and the pressure drop ($P_b - P_a$), all divided by the dynamic viscosity $\mu$ (in SI units, e.g., kg/(m·s) or Pa·s), and the physical length L of the pressure drop.

The negative sign in Darcy's general equation is needed because fluids flow from high pressure to low pressure. If the change in pressure is negative (e.g., in the X-direction) then the flow will be positive (in the X-direction). Dividing both sides of the above equation by the area and using more general notation leads to:

$$q = \frac{-\kappa}{\mu}\nabla P$$

where q is the filtration velocity or Darcy flux (discharge per unit area, with units of length per time, m/s) and ∇P is the pressure gradient vector. This value of the filtration velocity (Darcy flux) is not the velocity which the water traveling through the pores is experiencing.

The pore (interstitial) velocity (v) is related to the Darcy flux (q) by the porosity (ϕ). The flux is divided by porosity to account for the fact that only a fraction of the total formation volume is available for flow. The pore velocity would be the velocity a conservative tracer would experience if carried by the fluid through the formation.

Water treated by EC is likely to provide better flow rates underground in pressure-driven fracturing operations according to the following version of Darcy's law (relating to osmosis):

$$J = \frac{\Delta P - \Delta \Pi}{\mu(R_j + R_m)}$$

where,
J is the volumetric flux (m·s$^{-1}$),
ΔP is the hydraulic pressure difference between the feed and permeate sides of the membrane (Pa),
ΔΠ is the osmotic pressure difference between the feed and permeate sides of the membrane (Pa),
μ is the dynamic viscosity (Pa·s),
$R_f$ is the fouling resistance (m$^{-1}$), and
$R_m$ is the membrane resistance (m$^{-1}$).

In both the general and osmotic equations, increased discharge or volumetric flow is proportionate to decreased viscosity. Therefore, any treatment method that is likely to reduce viscosity in a fracturing fluid is also likely to improve the outcome of the fracturing process in terms of improvements to natural gas production.

Figure 2:
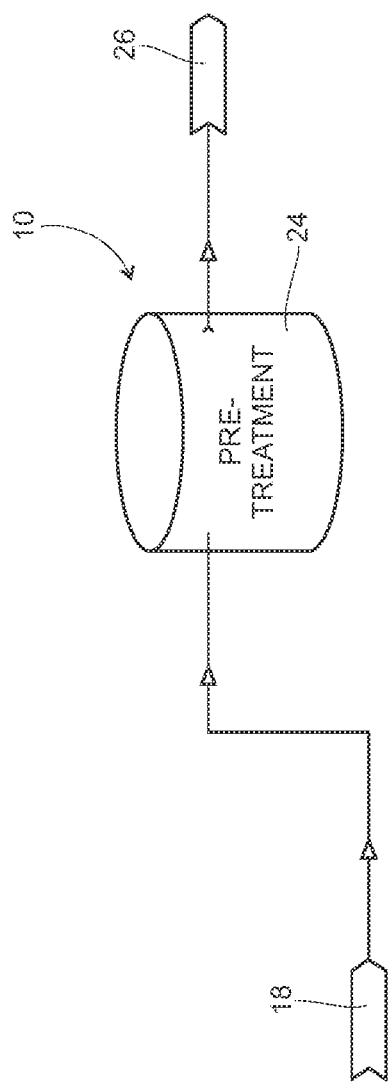
FIG. 2 is a schematic that is to be taken with FIGS. 3 and 4 and shows a pre-treatment storage tank for holding the flow back captured from the hydraulic fracturing fluid process prior to EC treatment.
Figure 3:
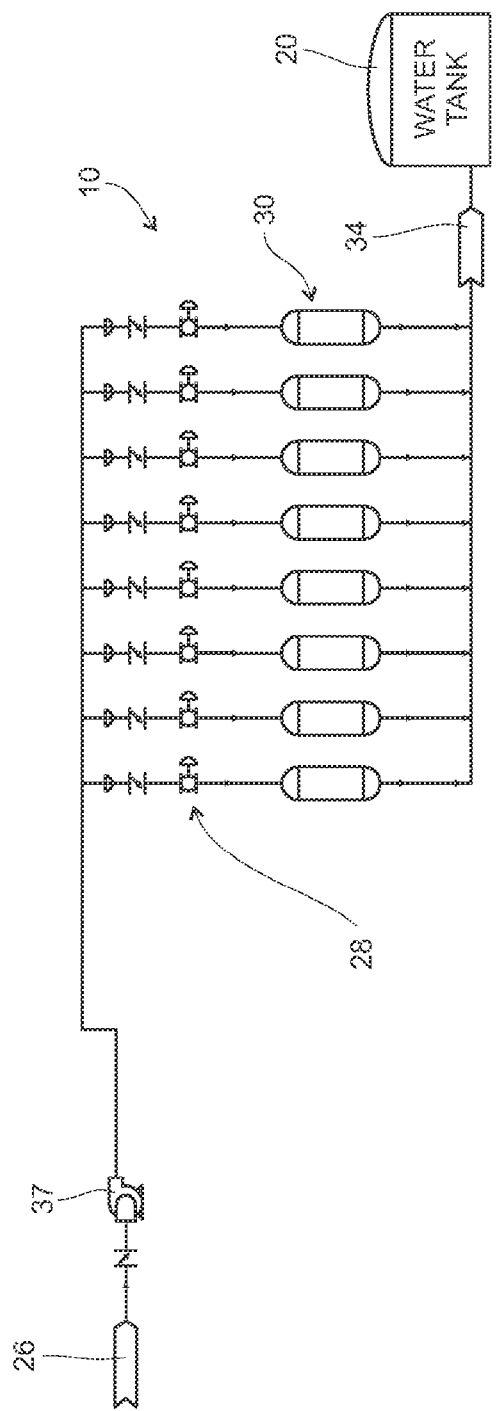
FIG. 3 is a schematic of a series of parallel EC treatment cells that receive fluid from the pre-treatment tank shown FIG. 2.

Once again, water that is delivered to the fracturing or well head site may come from a variety of sources. Using river water, as an example, the water may be relatively clean but it will still contain varying amounts of contaminants. Therefore, it may be desirable to use the EC system 10 for a threshold treatment of the water as it is delivered (thus reducing viscosity) and before mixing with sand or chemicals. As indicated above, the EC system 10 is otherwise self-contained so that it is easy to move to and from the well head 12. FIGS. 2 and 3 illustrate the basic operating parameters of the system 10.

In the recycling scenario, the flow back 18 is delivered to a pretreatment holding tank 24 (see FIG. 2). From there, the flow back is passed to a manifold feed system 28 (see FIG. 3) via line 26. The manifold system 28 distributes the flow back to a series of parallel EC treatment cells, indicated generally at 30. Each EC treatment cell has an internal configuration of charged plates that come into contact with the flow back.

Figure 4:
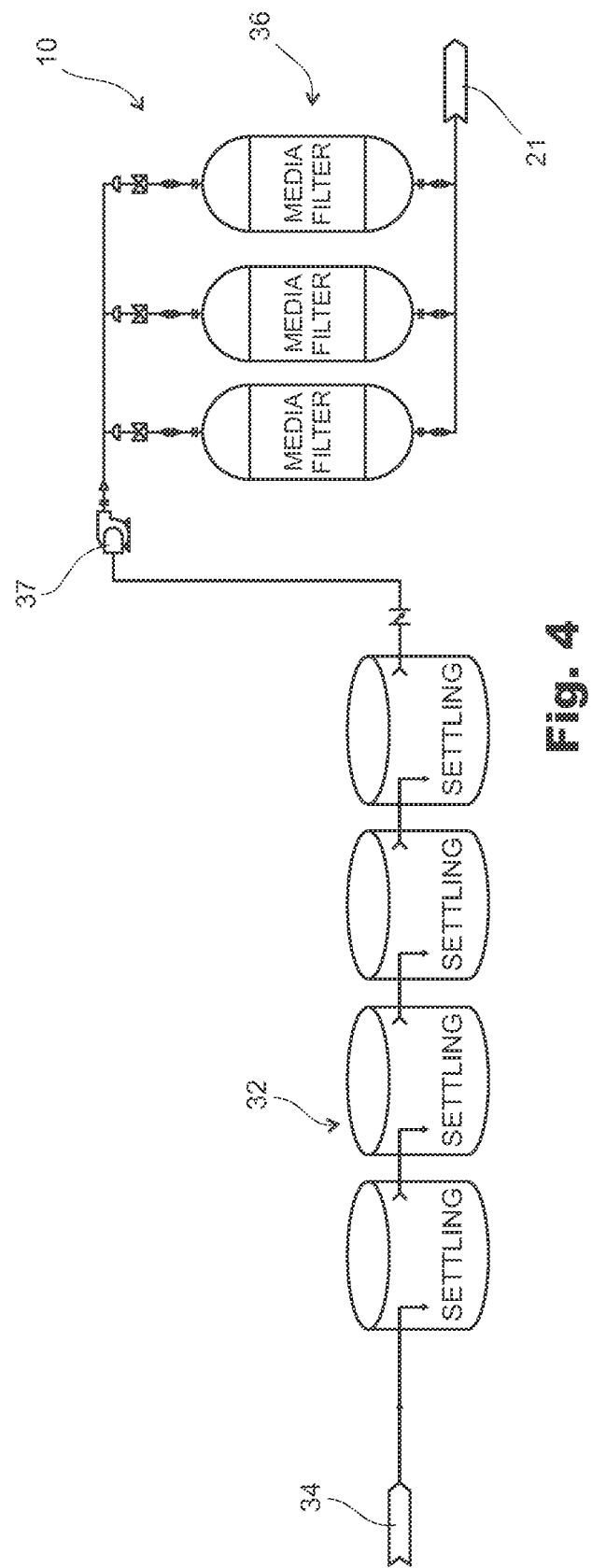
FIG. 4 is to be taken with FIGS. 2 and 3 and is a schematic showing a plurality of settling or "flocculation" tanks that receive fluid processed by the EC cells in FIG. 3, with the fluid being passed onto final stage processing through media filters.

EC treatment cells with charged plate configurations have been in general use with EC systems for a long time. However, to the extent possible, it is desirable to select plate and flow-through configurations that create turbulent flow within each cell. It is undesirable to generate significant amounts of flocculation within the cells 30 themselves. After treatment by the cells 30, the flow back is returned to a series of settling tanks 32 (see FIG. 4) via line 34.

The EC treatment in the cells causes flocculent to be subsequently generated in the settling tanks 32. There, the contaminants are removed from the water via a settling out process. Solid materials are removed from the settling tanks 32 and trucked off-site for later disposal in a conventional manner. The clarified water is then passed through sand media 36 (usually sand or crushed glass). Thereafter, the EC-treated water is passed onto the storage tank 20 (FIG. 1) for recycling in subsequent fracturing operations (see line 21 in FIGS. 1 and 4, respectively). Once again, the EC treatment positively improves the viscosity of the fluid (by reducing viscosity). Various pumps 37 are used at different points in the EC process to move the flow from one stage to the next.

There will be some variables in the overall EC treatment process from one site to the next because of chemical and similar differences in the fracturing fluid or flow back. Similarly, there may be variations that are dependent on the content of delivered water in those situations where the EC treatment process is used initially to treat incoming water before it is used in a fracturing operation.

Figure 5:
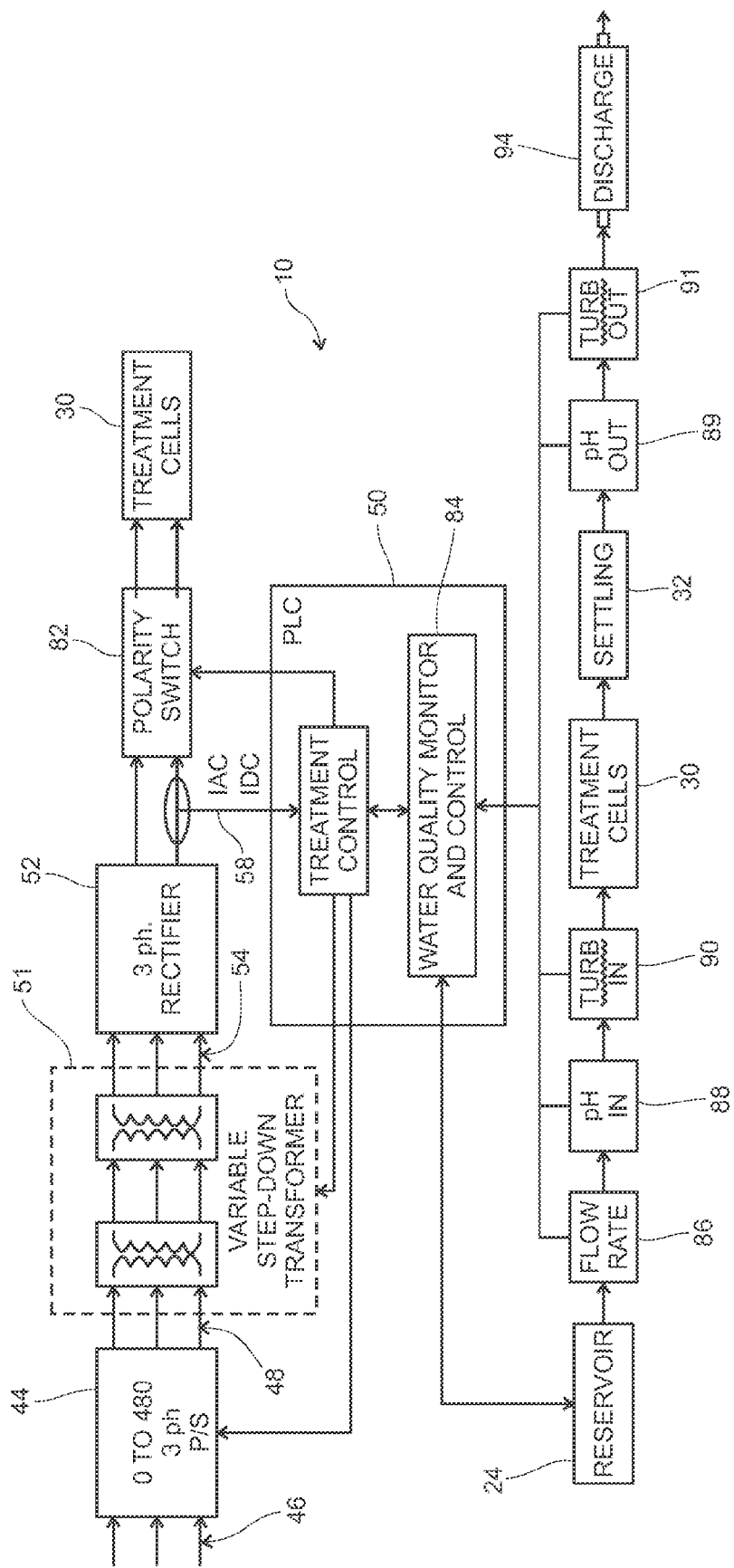
FIG. 5 is a block schematic diagram showing the operational control of the EC system.

FIG. 5 is a schematic that illustrates the control logic for the EC system 10 illustrated in FIGS. 1-3. The EC system 10 utilizes an adjustable power supply 44. Three-phase power is delivered to the power supply 44 at 480 volts AC ("VAC") (schematically indicated at 46 in FIG. 4). The output of the power supply 44 (indicated generally at 48) is a variable that is adjusted from 0 to 480 VAC by a controller 50. The power supply output 48 is delivered to a variable step transformer 51 that further step down the AC voltage from the power supply 40 before delivering it to a three-phase rectifier 52.

Both the power supply 44 and transformer 51 are conventional power system components when standing alone. The transformer 51 includes a series of "taps," which would be familiar to a person having knowledge of transformer systems. The "taps" provide different set points for stepping down the voltage across the transformer according to the power current level needed by the EC system 10.

The three-phase rectifier 52 converts the output (see 54) from the transformer 51 to direct current ("DC"). The three-phase rectifier 52 is also a conventional component, standing alone.

The transformer 51 evens out or prevents current "spikes" that are typical to the way adjustable power supplies work. The EC system 10 is adjusted to operate at a target current that maximizes EC cell operation. Part of this process involves imparting a charge to the fluid being treated without instigating significant amounts of flocculation in individual cells.

That is, the target current is conducted through the flow back (or other fluid under treatment) in the EC treatment cells 30 via the charged plates within the cells. The target current may be set manually by the EC system operator, depending on the water quality of the flow back after EC treatment. Alternatively, it may be set automatically via an algorithm described below:

$$I_{target} = I_{user} - ((Turb_{out} - Turb_{goal}) + (Turb_{in} - Turb_{cal})) \times (1/Flow)$$

Where:
$I_{target}$=Current system will maintain and hold to provide treatment
$I_{user}$=Current set point user has specified to provide the gross level of treatment
$Turb_{out}$=Turbidity out of treatment train
$Turb_{goal}$=Desired turbidity out of the system
$Turb_{in}$=Turbidity of the water to be treated
$Turb_{cal}$=Turbidity value to which the system is baseline
Flow=Flow rate through the treatment cells The controller 50 is a conventional programmable logic controller. The basic control of current to the treatment cells 30 will now be described by referring to FIG. 6.

The controller 50 ramps up to the target current 56 as follows. Reference numeral 58 (in FIG. 5) reflects the controller's constant monitoring of DC current ($I_{DC}$) and AC current ($I_{AC}$) output from the transformer 51 and three-phase rectifier 52. The EC system 10 uses a proportional integral derivative algorithm (PID) to maintain cell current to a set point defined by the user, as shown at 60. PIDs are generic algorithms that are well-known.

Unique to the present invention, the control logic includes a "power quality" ("PQ") calculation that is based on the following equation:

$$PQ = \frac{I_{AC}}{I_{DC}} \times 100$$

Both the AC ($I_{AC}$) and DC ($I_{DC}$) current values are sensed following rectification. The DC current ($I_{DC}$) is the averaged direct output from the rectifier 52. The AC current ($I_{AC}$) is the residual alternating current from the rectifier 52. The DC and AC values reflect different characteristics from the same wave form output by the rectifier 52.

The tap settings in the transformer 51 are adjusted, as shown at 62, depending on the power quality ("PQ") value. If the PQ is equal to or greater than 60 (as an example), or alternatively, if the sensed current is less than the target current, then the controller 50 adjusts the transformer tap settings (reference 64).

Figure 6:
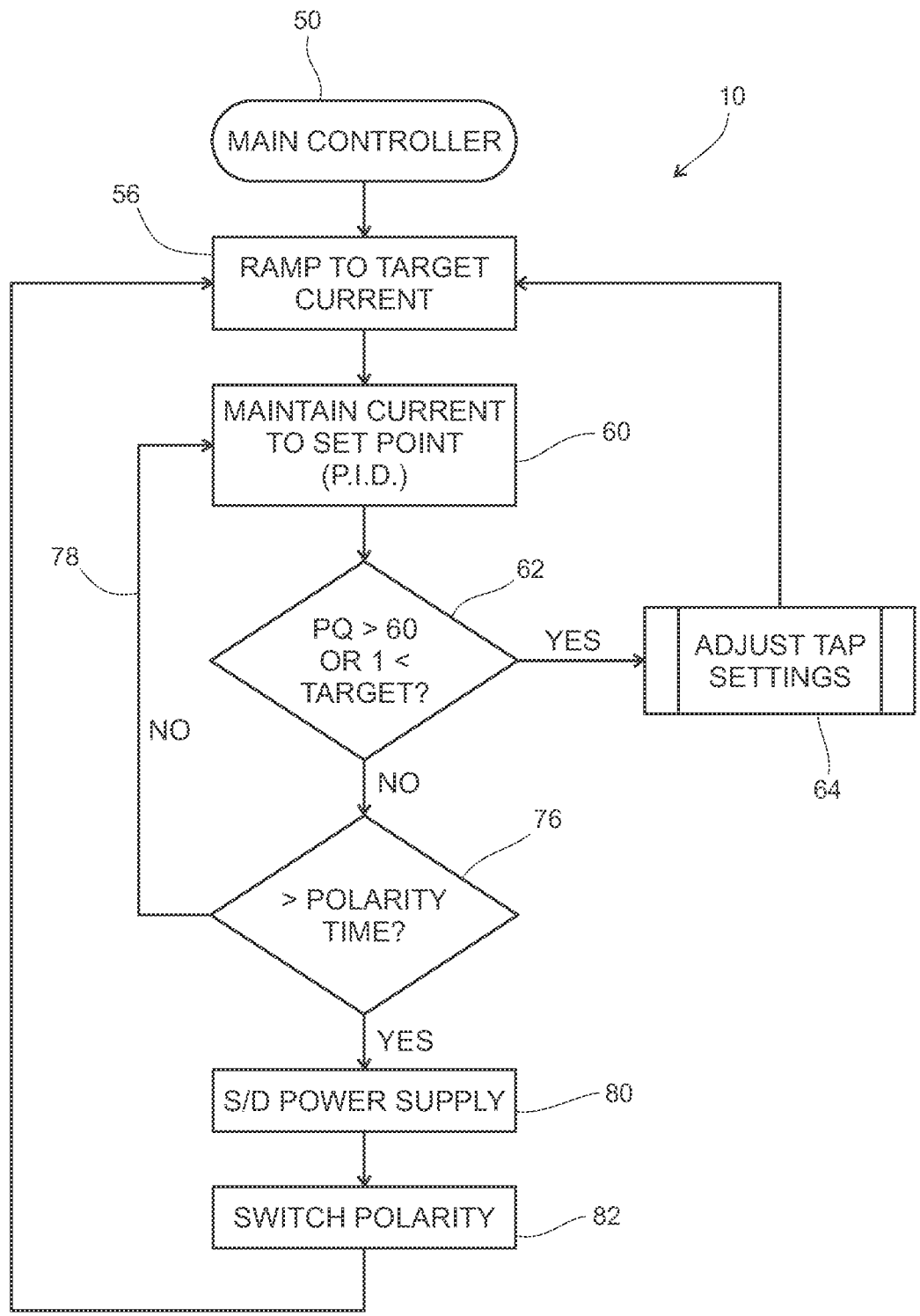
FIG. 6 is a block schematic diagram that illustrates electric current control for the EC system.
Figure 7:
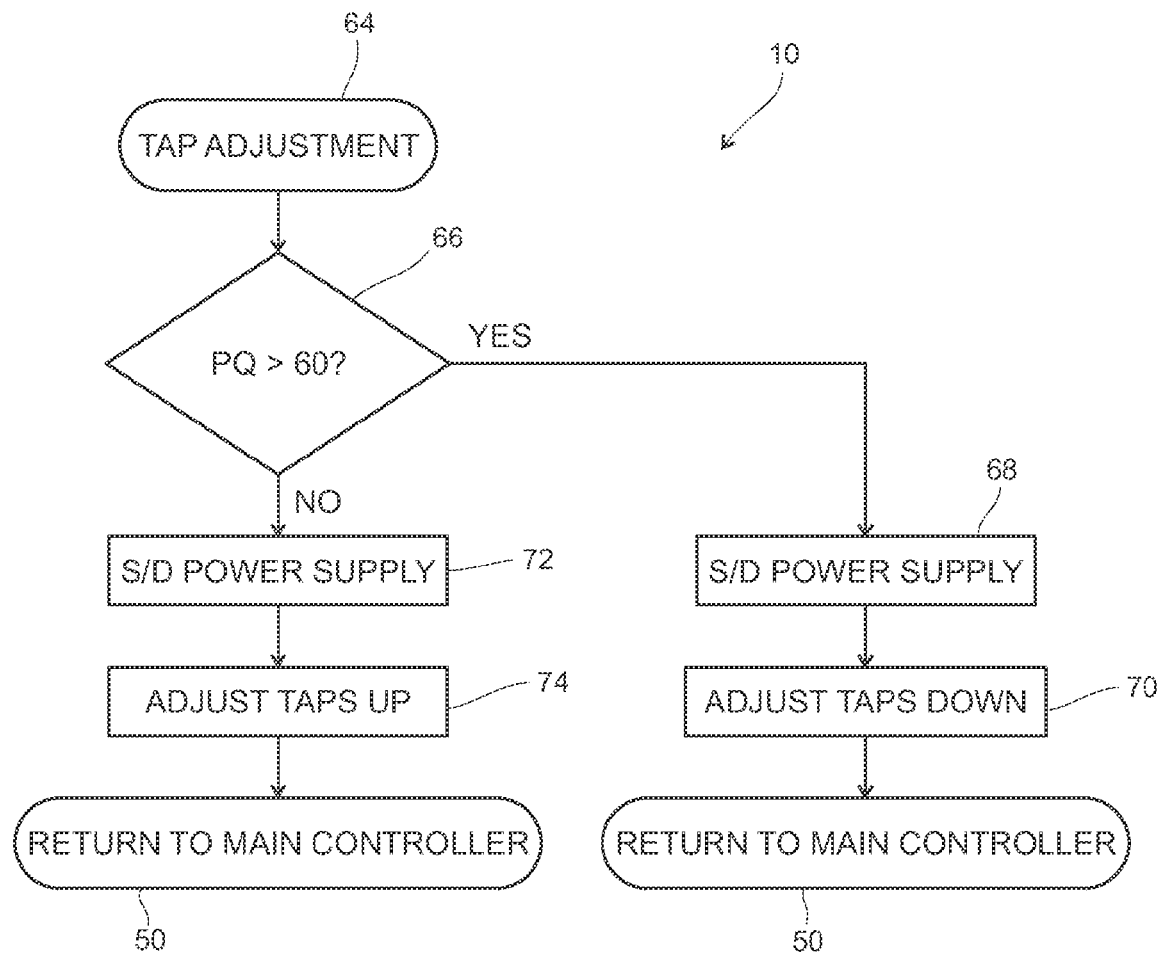
FIG. 7 is related to FIG. 6 and is a block diagram illustrating control of the tap settings in a transformer that makes up a portion of the EC system.

The control logic for the tap adjustment 64 is further illustrated in FIG. 6. Transformer taps are adjusted either upwardly or downwardly depending on the PQ calculation (referenced at 66). If PQ is equal to or greater than 60, for example, then the controller shuts down the power supply 68 (see, also, reference 44 in FIG. 4) for a brief period. At that point in time, the transformer taps are adjusted downwardly (item 70). As a skilled person would know, if the transformers have a set of five taps, then they are selected one at a time in the direction that steps voltage down another step (with the process repeated iteratively until the desired result is achieved. If PQ is not equal to or greater than 60, then the power supply is similarly shut down (see item 72), but the transformer taps are instead adjusted upwardly (reference 74).

Returning to FIG. 6, if the current set point is not outside the range specified in control logic block 62 (that is, the current setting is acceptable), then the controller 50 checks the polarity timing function 76. In preferred form, the EC system 10 is set to maintain polarity across a set of plates inside the EC treatment cells 30 for a specified period of time. The control logic will loop through the sequence just described (item 78) until the next polarity time-out is reached. At that point in time, the controller 50 once again shuts down the power supply (see item 80) and switches the polarity 82 of the plates inside the treatment cells to run until the next time-out period.

Referring again to FIG. 5, the controller 50 may also monitor incoming and outgoing flow rate (86) pH (88, 89), turbidity (90, 91), and other factors relating to the flow back via conventional sensor control logic 84. The pH of the flow back may need to be adjusted upstream of the EC cells so that no flocculation occurs in the flow back before it reaches and passes through the treatment cells 30. Flow rates and pH and turbidity factors 86, 88, 89, 90, 91 may be continually and automatically monitored by the controller 50. Depending on the quality of the output from the settling tanks 32, and after filtering (see 36, FIG. 4), the treated flow back could be recirculated through the system (not shown) until the EC system's operation is stabilized. Otherwise, the treatment water is discharged (reference 94) to the water tank 20 for recycling in the next hydraulic fracturing operation. Once again, the same basic treatment process is used if delivered water is treated prior to any use as a fracturing fluid.

The use of EC technology to enhance hydraulic fracturing in natural gas applications offers many advantages. The benefits of reduced viscosity were previously described. In addition, EC creates significant bacterial kill in the treated water—whereas bacteria in fracturing fluid is otherwise known to be undesirable. The direct field current generated in the EC cells 30 serves to kill bacteria. If aluminum plates are used in the cells 30, they will also generate aluminum hydrate which also affects certain bacterial types.

In preferred form, stable operation of the EC system 10 involves no or minimum chemical adjustment to the flow, with the treatment relying on the cell plate charge delivered by current control. It is preferred to deliver target currents in the range of 100 to 140 amps DC. These high currents can be achieved because of proper impedance matching provided by the variable step-down transformer 51 described above. It is also more power efficient to use a 3-phase rectifier (reference 52) in lieu of single-phase rectification. Different EC cell designs are possible. However, it is desirable to use cell designs that are capable of dissipating the heat potentially generated by putting high current loads on the plates.

The foregoing description is not intended to limit the scope of the patent right. Instead, it is to be understood that the scope of the patent right is limited solely by the patent claim or claims that follow, the interpretation of which is to be made in accordance with the established doctrines of patent claim interpretation.

What is claimed is:

1. A method for recycling fracturing fluid at a well during a hydraulic fracturing operation, comprising the steps of:
    introducing a hydraulic fracturing fluid into a subterranean formation, the hydraulic fracturing fluid including a mixture of water and other fracturing components that include proppant particulates;
    capturing at least a portion of the hydraulic fracturing fluid from the subterranean formation after a fracturing operation, the captured hydraulic fracturing fluid having certain contaminants;
    introducing the captured hydraulic fracturing fluid to an electrocoagulation ("EC") treatment process and using the EC treatment process to separate the water in the captured hydraulic fracturing fluid from other components in the captured hydraulic fracturing fluid;
    recycling the water separated via use of the EC treatment process to create a recycled hydraulic fracturing fluid, by directly mixing new proppant particulates into recycled water that is separated via the EC treatment process, and using the EC treatment process to reduce the viscosity of the mixture of recycled water and new proppant particulates; and
    reintroducing the recycled hydraulic fracturing fluid into the subterranean formation for a subsequent hydraulic fracturing operation, wherein the EC treatment process reduces the viscosity of the recycled hydraulic fracturing fluid during the fracturing operation.

2. The method of claim 1, wherein the EC treatment process includes:

providing a variable power supply that outputs an alternating current ("AC");

rectifying the output of the variable power supply from AC to direct current ("DC"); and varying the output of the variable power supply based on the ratio of AC to DC current after rectification.

3. The method of claim 1, further including adjusting the pH of the captured hydraulic fracturing fluid during the EC treatment process to facilitate effluent flocculation.

4. The method of claim 1, including:

using the EC treatment process to remove bacteria in the water separated from the captured hydraulic fracturing fluid before recycling the water in subsequent hydraulic fracturing operations.

5. A method for creating hydraulic fracturing fluid at a well during a hydraulic fracturing operation, comprising the steps of:

creating a hydraulic fracturing fluid by mixing water and other fracturing components that include proppant particulates;

using an electrocoagulation ("EC") treatment process on the water prior to mixing proppant particulates directly into the water, and thereby using the EC treatment process to reduce the viscosity of the mixture of water and proppant particulates when the mixture is used for the fracturing operation; and introducing the hydraulic fracturing fluid into a subterranean formation for a hydraulic fracturing operation, wherein the EC treatment process reduces the viscosity of the hydraulic fracturing fluid during the fracturing operation.

\* \* \* \* \*